(12) United States Patent
Andrus et al.

(10) Patent No.: US 7,147,270 B1
(45) Date of Patent: Dec. 12, 2006

(54) AUTOMATIC REAR AIRFOIL FOR VEHICLE

(76) Inventors: Paul Guy Andrus, 46 Wiltshire Place, Ancaster, Ontario (CA) L9K 1M5; Gayle Campbell-Andrus, 46 Wiltshire Place, Ancaster, Ontario (CA) L9K 1M5

( * ) Notice: Subject to any disclaimer, the term of this patent is extended or adjusted under 35 U.S.C. 154(b) by 0 days.

(21) Appl. No.: 11/127,600

(22) Filed: May 13, 2005

(51) Int. Cl.
*B62D 35/00* (2006.01)

(52) U.S. Cl. .................... 296/180.5; 296/180.1

(58) Field of Classification Search ............ 296/180.1, 296/180.4, 180.5; 180/903
See application file for complete search history.

(56) References Cited

U.S. PATENT DOCUMENTS 4,311,334 A * 1/1982 Jenkins .................... 296/180.4
6,409,252 B1 * 6/2002 Andrus .................... 296/180.4

FOREIGN PATENT DOCUMENTS

GB 1539452 * 1/1979 .............. 296/180.4
GB 2065047 * 6/1981 .............. 296/180.4

* cited by examiner

*Primary Examiner*—Dennis H. Pedder

(57) ABSTRACT

A twin bag inflatable rear airfoil for truck or transport trailer with attached shelves that bridge the surface gap between the trailer side and top surfaces, and the corresponding side and top surfaces of the inflatable bags. Shelves also bridge the upper surface gap between the two bags and provide a platform to deploy a collapsible yaw control fin. Another set of panels provide airfoil surfaces in the ground domain and are integral to the organised automatic folding and stowage of the apparatus. Interrupted ribs stiffen the inflatable surfaces while allowing them to fold in an orderly manner.

5 Claims, 4 Drawing Sheets

AUTOMATIC REAR AIRFOIL FOR VEHICLE

BACKGROUND OF THE INVENTION

The reduction in aerodynamic drag resulting from the addition of a boattail shaped appendage to a boxed shaped vehicle has been well examined. Drag reductions of 30% are realistically possible (NASA/TP-1999-206574, "A Reassessment of Heavy-Duty Truck Aerodynamic Design Features and Priorities"), and would correspond to fuel savings of 15% for a transport truck. There are however several practical requirements that pose difficulties to implementing such a device on a working transport trailer. The device must not impede the operation of the trailer doors, typically swinging double doors on trailers used for long-distance haulage. The device must present a smooth, gently tapering set of boattail (side) and backlight (top) surfaces that connect tightly to the trailer sides and top respectively for optimum aerodynamic performance. Given practical difficulties in tightly fitting an inflatable to the hardware laden trailer door perimeter, the present invention uses rigid shelves to bridge the gap that exists between the trailer's trailing edge and the inflated bags when the bags are mounted onto the doors away from the edges and door hinges. This arrangement is also advantageous in eliminating undesirable surface contours due to the inflatable bag's surface bulge that occurs in the transition zone where the airfoil meets the trailer. Not only must the device not impede door operation, but it must get out of the way of the doors without any significant dismantling effort on the part of the operator. Given that the device operates in a physically hostile environment, it must not vibrate to a degree that causes premature wear of its structural components. It should automatically collapse when the trailer stops so that it is not battered by high winds which could attack it directly from the side while stopped, unlike its' relatively wind sheltered position while travelling at highway speed.

The present design comprises dual ram-air inflated bags as a framing structure for the overlying airfoil surfaces. The force of the inflated bag internal pressure against the trailer doors is counterbalanced by the hingedly attached hardware that attaches the airfoil to the trailer, thereby drawing the hardware tight and minimizing its' vibration during airfoil operation. The inflation/deflation cycle occurs slowly and calmly over several minutes. Both of these aspects relating to the inflated bags minimize wear on the attachment hardware which is necessary for such a device to last several years without need for major structural maintenance. An inflatable however, requires surface shape control and stiffening in order to remain stable during operation, and avoid surface vibration and wear. To this end, the present disclosure describes a series of staggered interrupted ribs attached along the inflated bags surfaces that provides surface stability during inflation, while accommodating complex folding for stowage.

Transport trailers operate in conditions of cross wind creating an angle of yaw at which the air attacks the trailer, typically in the 5–10 degree range. Boattail surfaces tend to perform aerodynamically better in cross-wind (higher yaw) conditions, however the backlight loses its' drag reducing function as the angle of yaw rises. In order to preserve backlight performance in yaw, the present device provides for a vertical fin to redirect trailer roof air flow directly behind the trailer where it can contribute to pressure recovery as it would in the zero yaw condition. The present device overcomes practical operating difficulties of a fin such as structural integrity(flexibility) during high cross-wind conditions while still allowing for automatic deployment and stowage.

Given that the transport trailer is a road vehicle, drag relating to underbody airflow as well as flow around the rear wheels near the ground figures significantly in overall drag. The present device overcomes difficulties in practically cleaning up the airflow in this domain in order to approach theoretical minimum drag. To this end the present disclosure further describes a set of panels that provide for ground domain streamlining of airflow. A major difficulty in the deployment of rigid or semi-rigid panels as airfoil surfaces behind a trailer is the weight and complexity of adequate structural reinforcement, particularly if the panels are large enough to perform well aerodynamically and are not collapsed automatically when the trailer stops, thereby exposing them to severe ambient wind gusts. The present device overcomes these problems by anchoring the panels to the inflated bags, and by using bag surface tension to lift and lock panel support members into position and dampen their vibration. Graham (U.S. Pat. No. 6,854,788 B1) has used radially oriented collapsible tension bearing struts to stabilize the boattail surfaces. These struts are disposed and function in a manner similar to the radially oriented cords inside the inflatable bags of Andrus (U.S. Pat. No. 6,409,252 B1), the difference being that Graham creates boattail surface tension (that offsets strut tension) by bending semi-rigid flexible sheets for boattail surfaces, whereas Andrus uses air pressure within the inflatable bags. The panel support members of the present disclosure differ from the tension bearing radially oriented cords/struts of Andrus (U.S. Pat. No. 6,409, 252 B1) and Graham (U.S. Pat. No. 6,854,788 B1) in that they are rigid folding struts that lock into position when the boattail panels are deployed thus fixing the panels against movement both laterally and medially, and therefore do not depend upon boattail surface tension to be stiffened. The main advantage of this approach over that of Graham (U.S. Pat. No. 6,854,788) is that the panels can be easily collapsed automatically when the airfoil is not in use without having to open the trailer doors. The panels as disclosed herein therefore do not depend on trailer door closure in order for them to assume an aerodynamically effective angle relative to the side of the trailer. Examples of scenarios in which automatic collapse of the panels would be preferable include stopping or city driving when severe ambient winds prevail in order to avoid wind damage, parking in a trailer yard in order to avoid parking damage and space usage, and having a damaged airfoil during long distance delivery such that it is not safe to deploy yet not near repair shop.

SUMMARY OF THE INVENTION

The invention relates to rigid panels, ribs and fins for an inflatable trailer airfoil. While the inflatable approach provides size and vibration tolerance with minimum weight and easy collapsibility, there are airflow surface domains that are better treated with a relatively rigid sheet. The panels are deployed in three domains. The first are shelves that bridge the airfoil surface gap that occurs between the trailing edges of the trailer and the inflated bags because of door hinging and other hardware mounting restrictions for the bags, as well as practical considerations relating to inflatable shape control in the transition zone where the trailer meets the airfoil. Another set of shelf panels bridge the gap between the two bags' top surfaces, and support a fin that corrects for the undesirable effects of crosswind (yaw) on drag reduction by the backlight (top) surface of the airfoil. The last set of panels extends the airfoil surface below the lowest level to which the bags can extend due to trailer door handle access requirements and practical limitations in the extent to which the bags hang when deflated. This last set of panels also plays a role in the orderly method of deflation and stowage such that the airfoil is resistant to severe wind and weather while stowed. In order to stiffen the majority of the airfoil surface with a minimum of weight and materials, a series of interrupted ribs are attached along the inflatable surfaces. The rib interruptions allow the bags to fold for stowage. A flexible surface skin is then added to cover the ribs and provide a smooth airflow surface. With respect to aerodynamic or fuel saving function, the components may be grouped into those working in the boattail (side surface) domain and those working in the backlight (top surface) domain, as each of these could work independently of the other. A cheaper and lesser performing version of the present invention could be constructed using only the boattail aspects, or alternatively only the backlight aspects.

Figure 1:
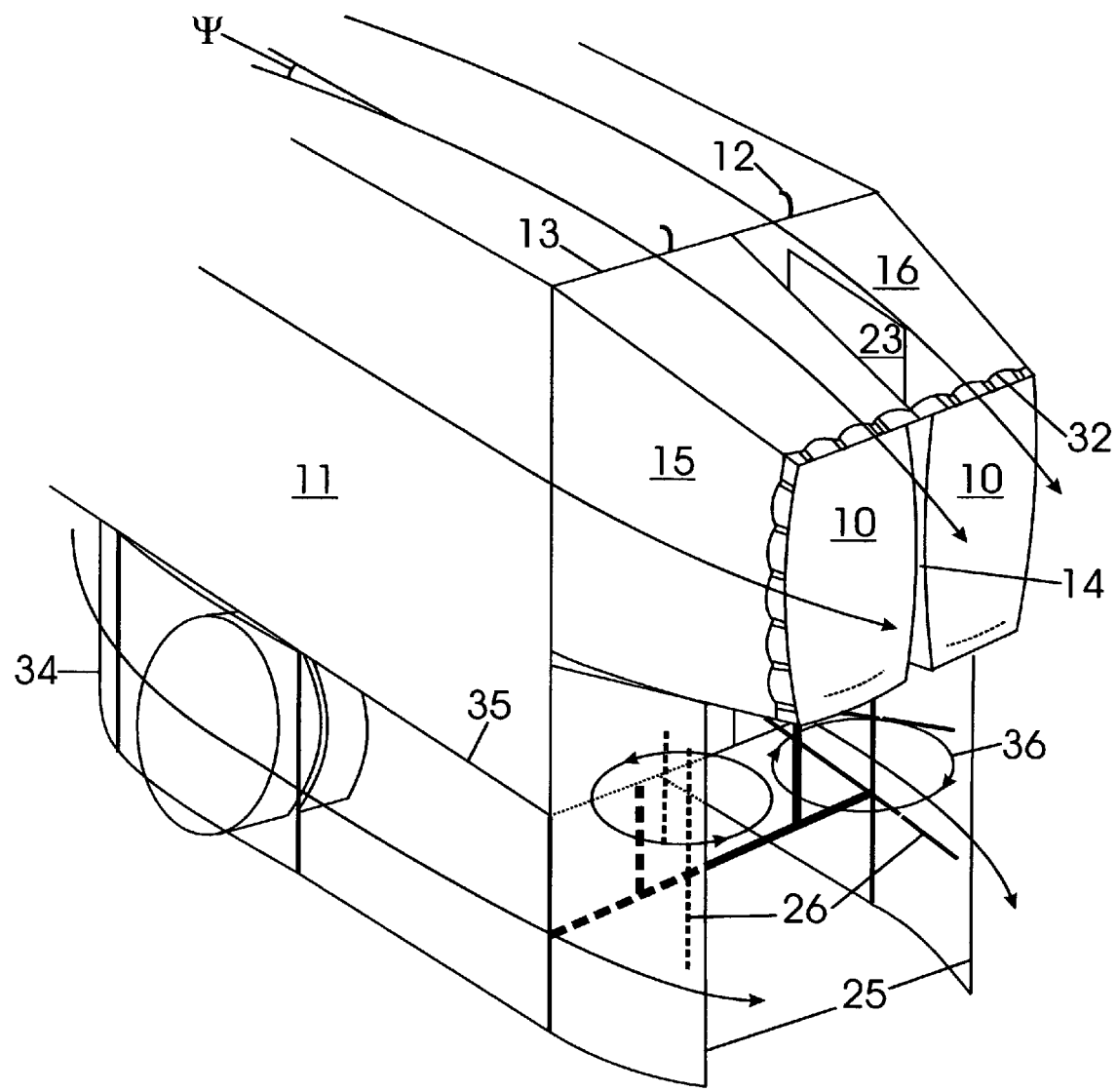
FIG. 1 is a perspective view of the airfoil fully deployed.
Figure 2:
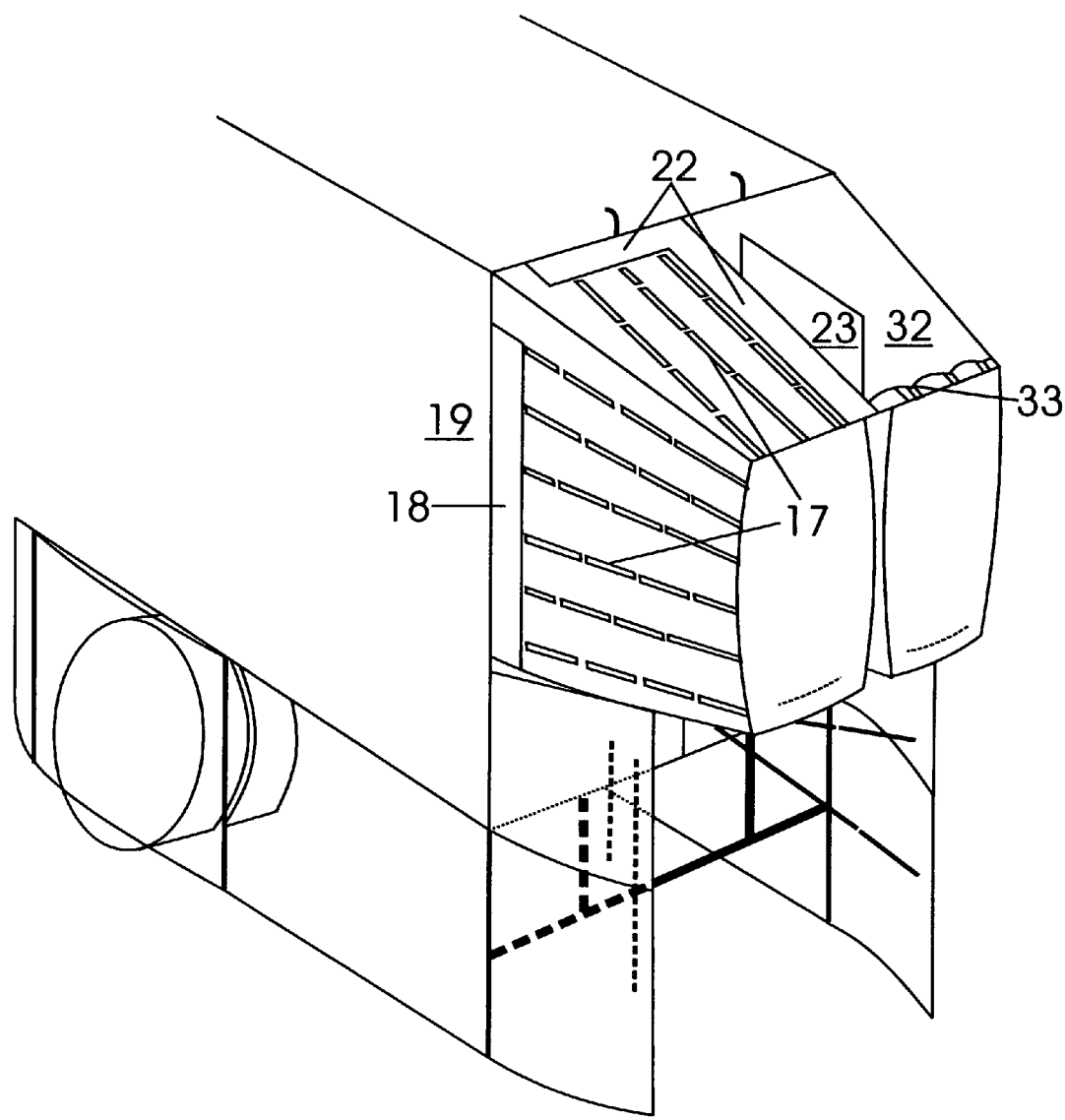
FIG. 2 is a perspective view with the airfoil's outer skin removed from the left bag to expose the underlying framing structures.
Figure 3:
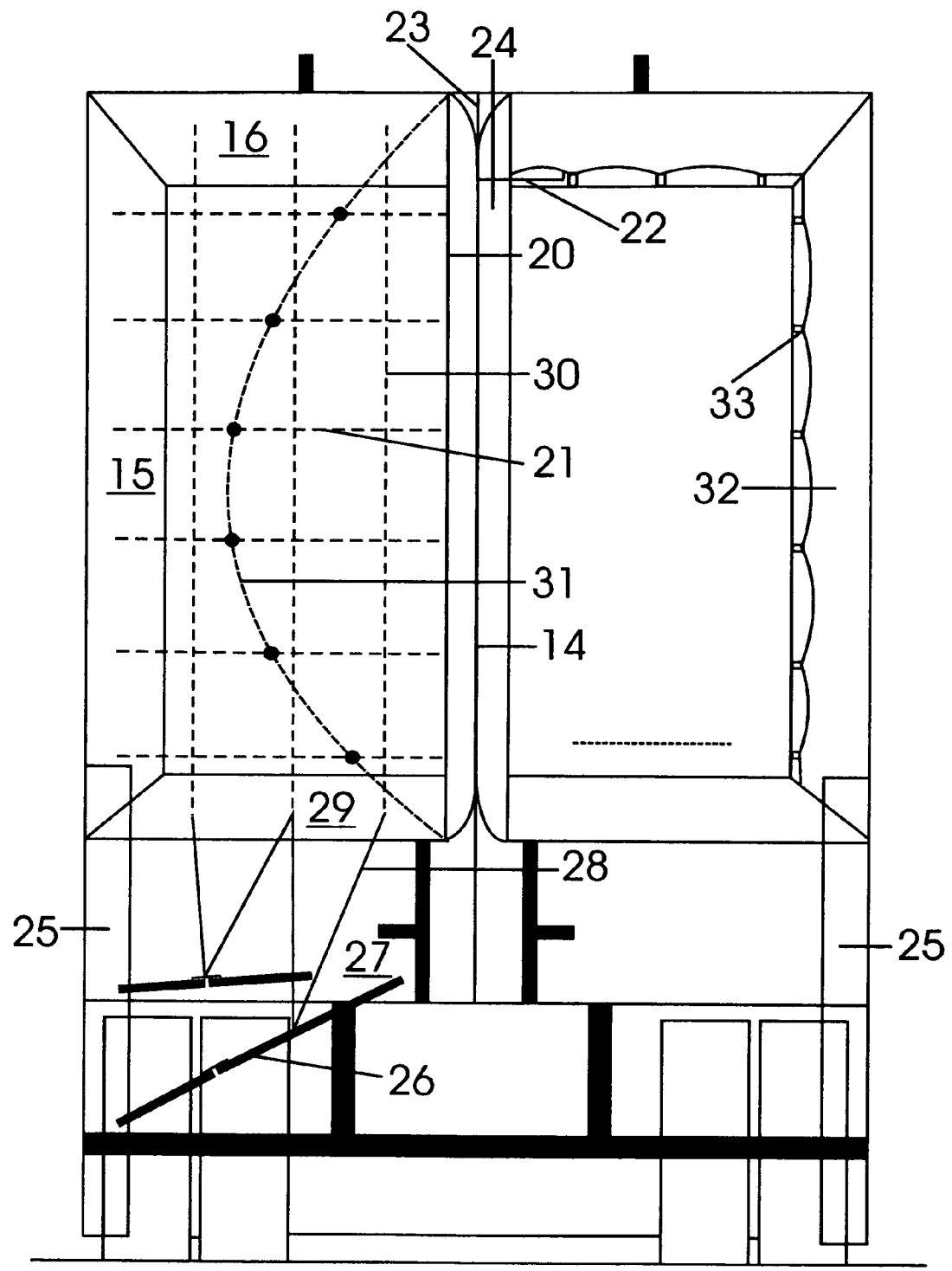
FIG. 3 is a rear view of the airfoil fully deployed with the internal elastic and inelastic cord arrangements schematically depicted within the left bag.
Figure 4:
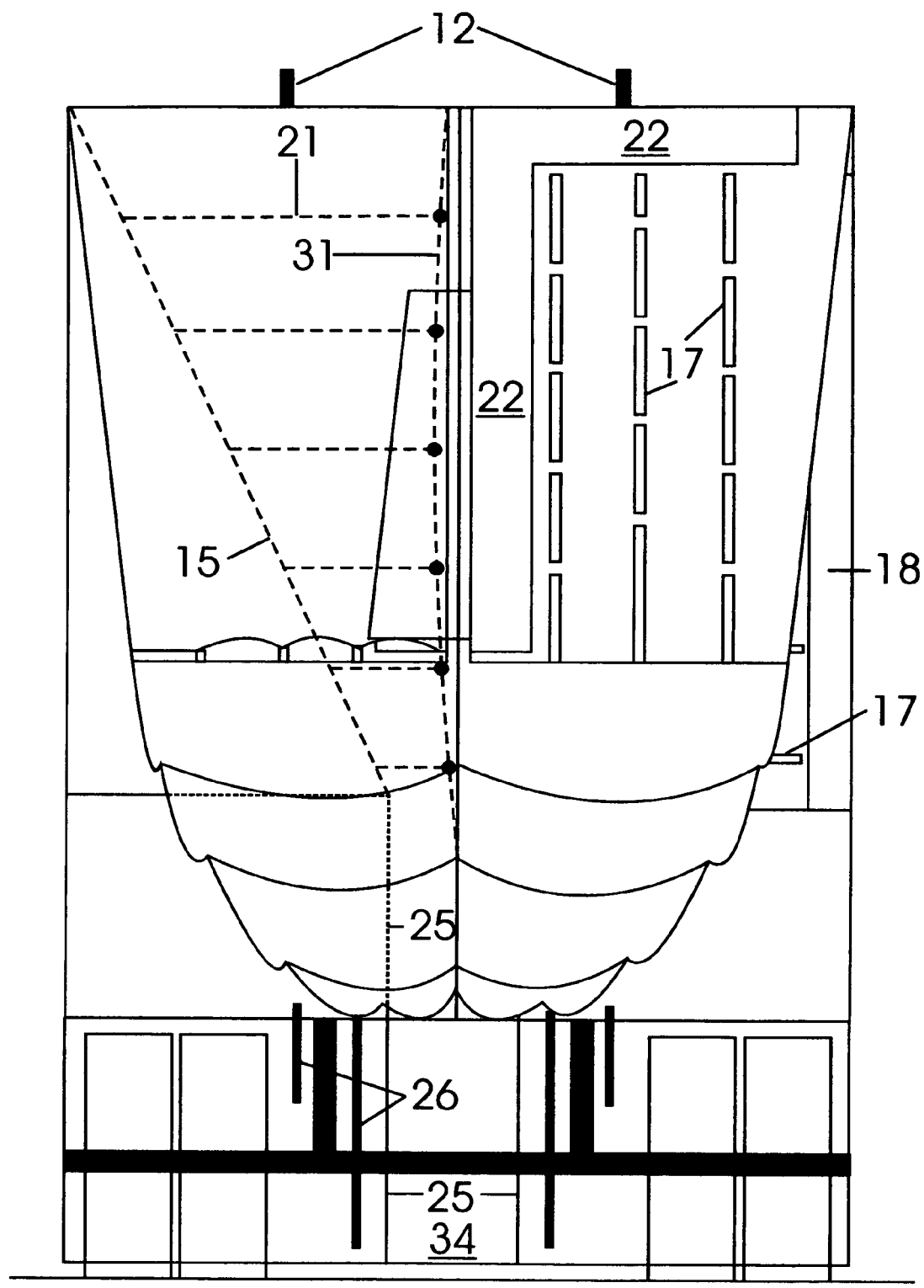
FIG. 4 is a rear view of the airfoil when collapsed with the outer skin removed from the right bag and the internal cord arrangements shown within the left bag.

DETAILED DESCRIPTION OF THE
PREFERRED EMBODIMENT

The device is comprised of a pair of inflatable bags 10 that are inflated upon forward motion of the trailer 11 by ram air intake scoops 12 that extend above the trailer roof line 13 from each bag 10. The bags 10 are pressed together along a central cleft 14 when inflated, and this union has a stabilising effect on the apparatus. The boattail 15 and backlight 16 surfaces are reinforced by a series of staggered interrupted ribs 17 to create rigidity during inflation, while enabling complex folding during deflation. A boattail shelf 18 is fixed to the boattail surface 15 and extends forwardly to meet the trailer side 19. The boattail surface 15 is anchored to the medial edge 20 of the base of each bag via a series of cords 21 that extend radially from the medial edge 20 to the boattail surface 15. A backlight shelf 22 is fixed to the backlight surface 16 and extends forwardly to meet the trailer roof line 13, and medially to meet the opposite shelf. A yaw control fin 23 is hingedly attached to one of the backlight shelves 22, and to the medial surface 24 of one bag within the central cleft 14. The fin 23 is thereby firmly yet flexibly held in a vertical orientation during inflation, but collapses during deflation. Air approaching the trailer at an angle of yaw shown as ψ is redirected by the fin 23 to flow parallel to the fin (and the trailer 11). Rigid boattail panels 25 are attached to and extend downward from the lower boattail surface 15 of each bag to the bottom of the trailer 11, and if desired down further down towards the road. The panels are held stiffly in their deployed position by hinged rods 26 that extend from the lower trailer door 27 to the panels 25. The rods 26 are lifted and held firmly in their deployed positions by cords 28 that insert into the lower surface 29 of each bag 10. Vertically oriented cords 30 within each bag extend from the lower 29 to the backlight 16 surfaces. The backlight surface 16 is thereby anchored to the hinged rods 26 (via the vertical cords 30) so that the backlight surface 16 is not variably lifted by the backlight airflow. While the hinged rods 26 bear the lift load, the more dominant internal pressure load upon the underside of the backlight surface 16 is evenly offset by the internal pressure on the lower surface 29 via the vertical cords 30. The arrangement of the combined vertical 30 and radial 21 cord arrays ensures a symmetrical static force balance which prevents shape distortions in the bag such as sagging during inflation. This system is disclosed in Andrus (U.S. Pat. No. 6,409,252 B1). The combined vertical 30 and radial 21 cord arrays in conjunction with the staggered interrupted ribs 17 allow for substantially planar (gently curved) boattail 15 and backlight 16 surfaces while avoiding deep surface dimpling which would weaken surface stability when inflated. Elastic cords 31 are attached to the radial cords 21 (and by extension to the boattail surfaces 15) in a semicircular orientation during inflation, so that when internal bag pressure drops, the elastic cords 31 contract and draw the boattail surfaces 15 into a flatly folded condition. This system is a refined version of that disclosed in Andrus (U.S. Pat. No. 5,236, 347). A covering skin 32 extends from the boattail 18 and backlight 22 shelves to be fixed under tension along its' trailing edge 33 at the rearward end of each row of interrupted ribs 17. The air drag can by further reduced by treating the underbody airflow by either adding side trailer skirts, or by adding a shroud 34 around the rear wheel apparatus. In either case the boattail panels 25 may then be extended below the lower edge 35 of the trailer 11 towards road level so that this domain is optimally treated as well with respect to its' aerodynamic drag. A recirculating zone 36 of airflow is created behind the panels 25 and over the lower surface 29 of the bag 10.

We claim:

1. An inflatable airfoil adapted to be mounted on the rear surface of a transport vehicle, said vehicle having side and top surfaces, said airfoil comprising a pair of flexible enclosed bags, said bags having lateral and lower surfaces wherein a rigid panel extends from the lower part of said lateral bag surface downwardly towards the ground and forwardly to meet said side vehicle surface, said rigid panel having a rigid support member extending from said rigid panel to the lower portion of said rear vehicle surface, said rigid support member having a hinged interruption along the length of said rigid support member, said rigid support member having one or more cords attached along the length of said rigid support member, said cords attaching to the lower surface of said bag such that upon inflation of said bag, said rigid support member is lifted and unfolded while said rigid panel is positioned parallel to said lateral surface.

2. An inflatable airfoil adapted to be mounted on the rear surface of a transport vehicle, said vehicle having side and top surfaces, said airfoil comprising a pair of flexible enclosed bags, said bags having upper surfaces wherein said upper surfaces each have a rigid shelf oriented parallel to said upper surfaces, said rigid shelves extending forwardly to meet said top vehicle surface and medially to approach the rigid shelf that extends medially from the other of the two bags, one of said rigid shelves having a rigid fin attached along the medial edge of said rigid shelf, said rigid fin oriented substantially perpendicular to said rigid shelves when said bags are inflated, said rigid fin extending upwards above the level of the rigid shelves when said bags are inflated such that air flowing over the upper surface of said bags is directed to flow parallel to said fin.

3. An inflatable airfoil as recited in claim 2 wherein said rigid fin is hingedly attached along the medial edge of said rigid shelf such that said fin collapses to be oriented substantially parallel to said rigid shelves when said bags are deflated.

4. An inflatable airfoil adapted to be mounted on the rear surface of a transport vehicle, said vehicle having side and top surfaces, said airfoil comprising a pair of flexible enclosed bags, said bags having upper and lateral surfaces wherein a series of rigid members are attached along the length of said upper and lateral surfaces such that said lateral surfaces are stiffened horizontally and said upper surfaces are stiffened medially when said bags are inflated.

5. An inflatable airfoil as recited in claim 4 wherein one or more of said rigid members along said lateral surfaces has an interruption along the length of said rigid member such that said lateral surface folds at said interruption when said bag is deflated.

\* \* \* \* \*